(12) United States Patent
Ford

(10) Patent No.: US 9,421,484 B2
(45) Date of Patent: Aug. 23, 2016

(54) SAND CHECK FILTER

(76) Inventor: Michael Brent Ford, St. George, UT (US)

(*) Notice: Subject to any disclaimer, the term of this patent is extended or adjusted under 35 U.S.C. 154(b) by 750 days.

(21) Appl. No.: 13/310,974

(22) Filed: Dec. 5, 2011

(65) Prior Publication Data

US 2013/0140247 A1    Jun. 6, 2013

(51) Int. Cl.
*B01D 35/02* (2006.01)
*E21B 17/10* (2006.01)

(52) U.S. Cl.
CPC ............ *B01D 35/02* (2013.01); *E21B 17/1071* (2013.01); *Y10T 137/794* (2015.04)

(58) Field of Classification Search
None
See application file for complete search history.

(56) References Cited

U.S. PATENT DOCUMENTS

| | | | | |
|---|---|---|---|---|
| 2,640,545 A | * | 6/1953 | Share | E03B 3/12 166/157 |
| 2,815,190 A | * | 12/1957 | Dawson, Jr. | 166/290 |
| 2013/0140247 A1 | * | 6/2013 | Ford | 210/767 |

* cited by examiner

*Primary Examiner* — Robert James Popovics
(74) *Attorney, Agent, or Firm* — Weiss & Moy, P.C.; Veronica-Adele R. Cao

(57) ABSTRACT

A sand check filter for preventing solids from reentering into a pump. The filter is designed to mount atop a conventional rod pump. The filter allows well fluid, that contains high solids, to pass through the pump under normal operation while eliminating the solids from being swept back into the pump barrel. The filter includes a sleeve that has radial flutes that allows the sleeve from hanging up, sticking to or wedging itself to the valve rod. The sleeve is rotated on the valve rod to create a valve effect atop the filter. This prevents the fluid from passing through the inner diameter of the screen and forces solids within the fluid to be redirected to the outer diameter of the filter. This allows the fluid to be filtered before reentering the pump.

17 Claims, 6 Drawing Sheets

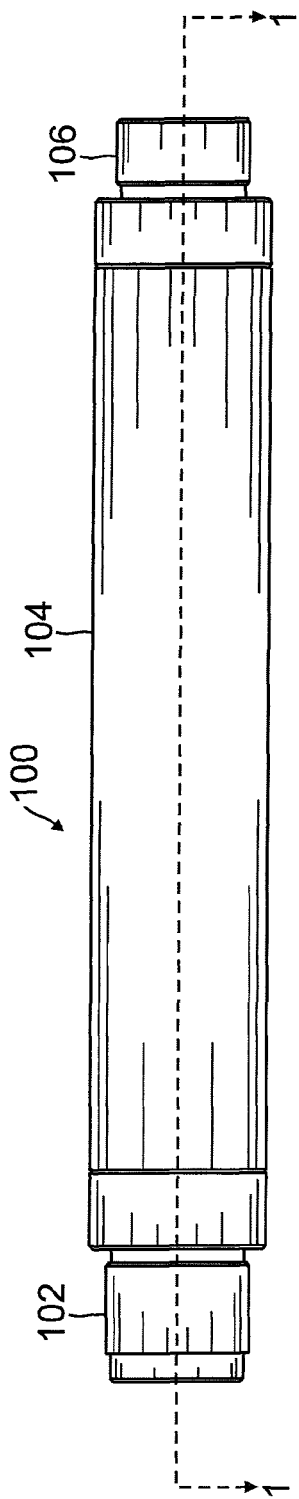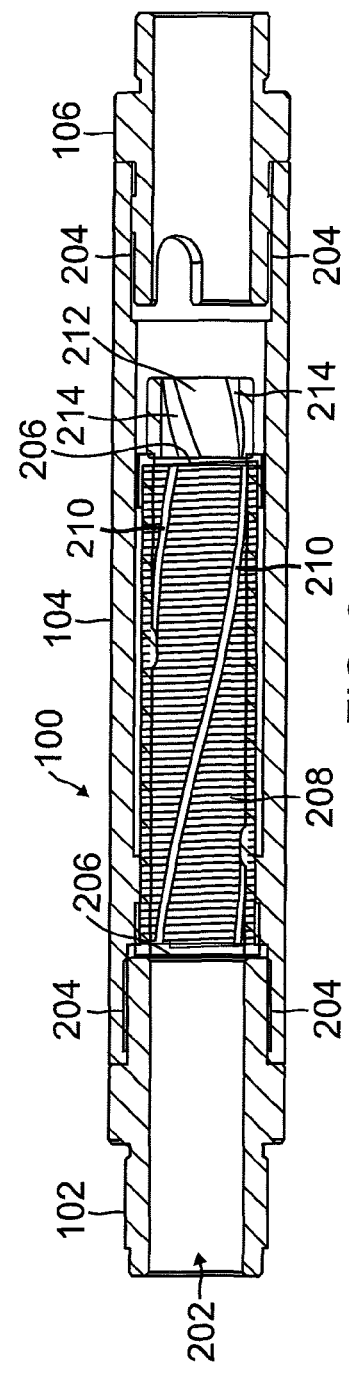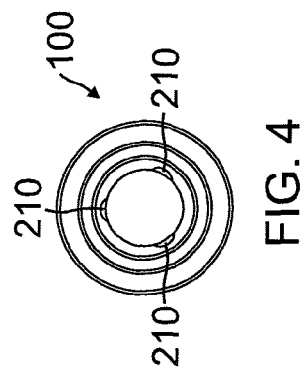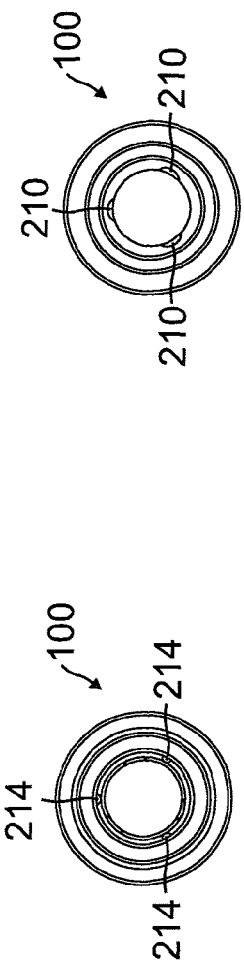

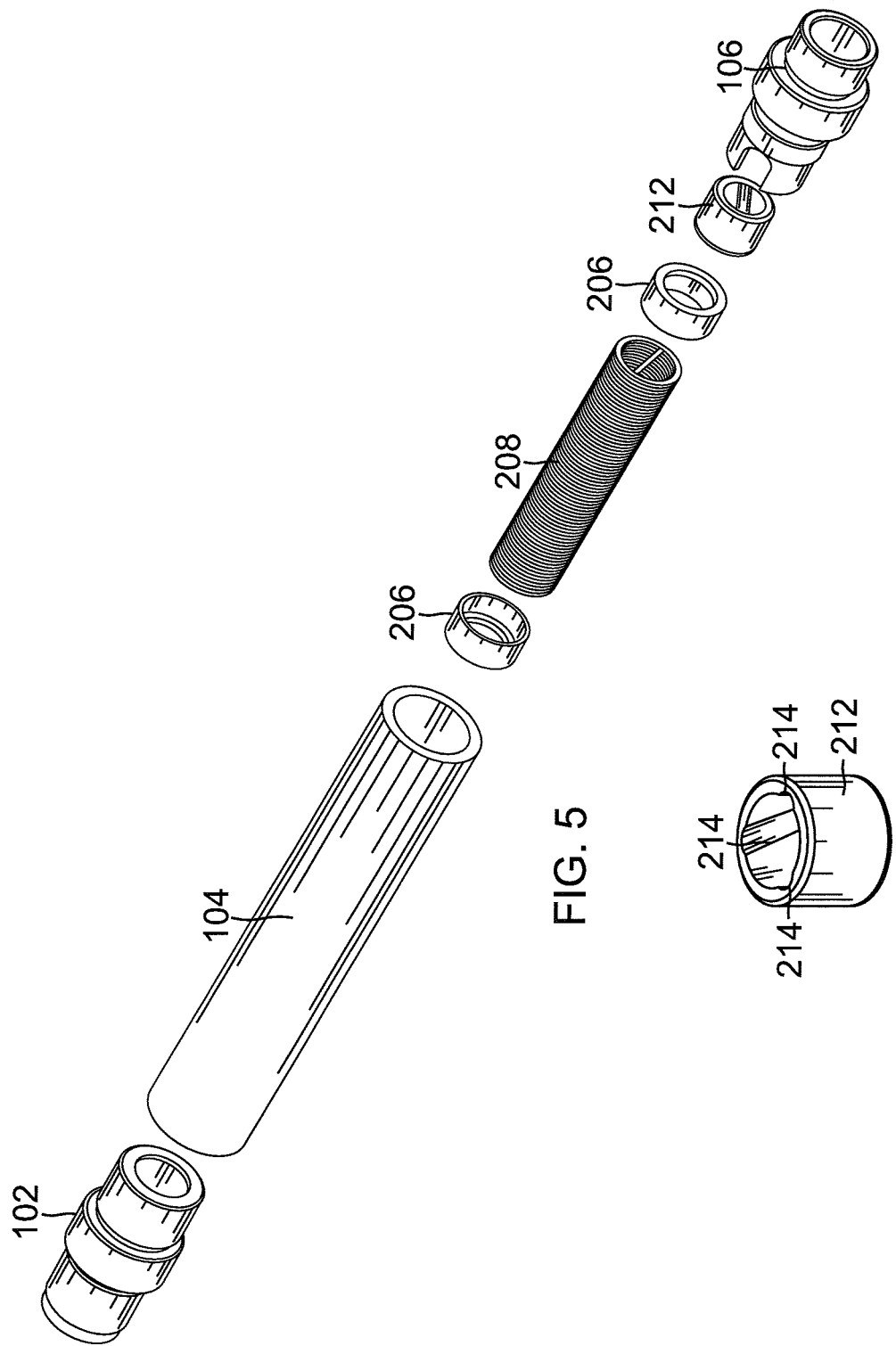

SAND CHECK FILTER

TECHNICAL FIELD

The present application generally relates to fluid pumping apparatuses and, more particularly, to a sand check filter for use with a conventional rod pump to prevent solids from reentering into the pump.

BACKGROUND

Oil well pumping systems are well known in the art. Such systems are used to mechanically remove oil or other fluid from beneath the earth's surface, particularly when the natural pressure in an oil well has diminished. Generally, an oil well pumping system begins with an above-ground pumping unit, which can be commonly referred to as a "pumpjack," "nodding donkey," "horsehead pump," "beam pump," "sucker rod pump," and the like. The pumping unit creates a reciprocating up and down pumping action that moves the oil or other substance being pumped out of the ground and into a flow line, from which the oil is then taken to a storage tank or other such structure.

Below the ground, a shaft is lined with piping known as "tubing." Into the tubing is inserted a string of sucker rods, which ultimately is indirectly coupled at its north end to the above-ground pumping unit. The string of sucker rods is indirectly coupled at its south end to a subsurface pump that is located at or near the fluid in the oil well. The subsurface pump has a number of basic components, including a barrel and a plunger. The plunger operates within the barrel, and the barrel, in turn, is positioned within the tubing. It is common for the barrel to include a standing valve and the plunger to include a traveling valve. The north end of the plunger is typically connected to a valve rod, which moves up and down to actuate the pump plunger. The valve rod passes through a guide positioned at the north end of the barrel, which assists in centering the valve rod and thereby, the plunger. In addition, the guide includes openings through which the oil or other substance being pumped can exit the pump barrel and travel into the tubing.

There are a number of problems that can occur during oil pumping operations. Fluid that is pumped from the ground is generally impure, and includes solid impurities such as sand, pebbles, limestone, and other sediment and debris. Certain kinds of pumped fluids, such as heavy crude, tend to contain a relatively large amount of solids. Because of this, several disadvantages exist with prior valve rods. For example, after the solids have been exhausted from the pump barrel and the pump has temporarily discontinued pumping operations, the solids will naturally begin to settle due to gravity. With prior art valve rods, the solids are able to reenter the pump barrel at this time. This often results in excessive barrel wear upon restarting of the pump. Furthermore, it is possible that with the solids reentering the pump barrel, they can cause sticking of the pump i.e., seizing the plunger in the barrel.

Conventional pumps discharge fluid into the tubing allowing the fluid to move to the surface. On upstrokes, the well fluid through the pump discharges to the top valve rod guide. When the plunger moves downward back into the barrel, the open cage atop the pump allows fluid that was just discharged to reenter the barrel through the rod guide. The fluid discharged into the tubing from the pump contains solids that concentrate themselves into the first two or three joints of tubing due to gravity. The fluid contained in this section of tubing is concentrated and contains a higher percentage of solids than the fluid that was just discharged thus introducing additional solid impurities that create additional damage to both the barrel and plunger.

The present application relates to a sand check filter for use with conventional rod pumps for preventing or reducing the amount of solids from reentering back into the pump. It addresses the problems encountered in prior art pumping systems as well as provides other, related advantages.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a sand check is provided. The sand check can include a body portion having a plurality of downwardly tapering flutes, wherein each flute of the plurality of flutes includes an opening. In addition, the sand check can include a neck portion coupled to the body portion having at least one radial groove formed on an interior diameter of the neck portion and ending through at least one aperture defined on an outer diameter of the neck portion. The sand check can also include a head portion coupled to the neck portion. The sand check can include a longitudinal channel defined through the body portion, neck portion and head portion.

In accordance with another aspect of the present application, a method for removing solids from pumped fluid using a sand filter assembly is provided. The method can include forcing the pumped fluid having the solids to an outer diameter of the sand filter assembly. In addition, the method can include filtering the solids from the pumped fluid before the pumped fluid reenters the sand filter assembly.

In accordance with yet another aspect of the present application, an apparatus for preventing solids from reentering into a pump is provided. The apparatus can include a plurality of radial ribs that create a cyclone effect on fluid being pumped, the cyclone effect forcing solids within the fluid to an outer edge of the apparatus while allowing the fluid to pass through to a valve rod guide. In addition, the apparatus can include a screen filter removing the solids from the fluid.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, can be best understood by reference to the following detailed description of illustrative embodiments when read in conjunction with the accompanying drawings, wherein:

FIG. 1 is a side view of an exemplary sand check assembly in accordance with one aspect of the present application;

FIG. 2 is a cross-sectional view of the exemplary sand check assembly taken through line 1-1 of FIG. 1;

FIG. 3 is a top view of the exemplary sand check assembly of FIG. 1;

FIG. 4 is a bottom view of the exemplary sand check assembly of FIG. 1;

FIG. 5 is a top perspective view of components within the exemplary sand check assembly of FIG. 2;

FIG. 6 is a top perspective view of an exemplary sand check of FIG. 2;

DESCRIPTION OF THE APPLICATION

Figure 7:
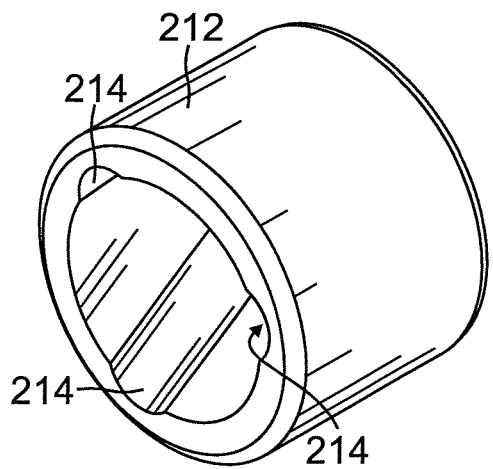
FIG. 7 is a bottom perspective view of the exemplary sand check of FIG. 6.

The foregoing description is provided to enable any person skilled in the relevant art to practice the various embodiments described herein. Various modifications to these embodiments can be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

Overview

Generally described, the present application relates to fluid pumps and associated systems and, more particularly, to a sand check filter that can be used with a conventional rod pump for preventing solids from reentering into the pump. In one illustrative embodiment, the sand check filter can be designed to mount atop a conventional rod pump. The filter can allow well fluid that contains high solids to pass through the pump under normal operation while eliminating the solids from being swept back into the pump barrel. The filter can include a sleeve that has radial flutes that allows the sleeve from hanging up, sticking to or wedging itself to the valve rod. The sleeve can be rotated on the rod to create a valve effect atop the filter. This can allow the fluid to pass through the inner diameter of the screen and force solids within the fluid to the outer diameter of the filter. Fluid can also be filtered before reentering the pump and provided through the top valve rod guide or open cage.

Numerous advantages can be realized through the sand check filter illustrated above. The filter can facilitate the movement of clean fluid, with solids removed, to the surface of the pump. By removing these solids, damage is reduced to the plunger and barrel. The filter can extend the life of the valve rod and guide by eliminating excessive solids from entering the valve rod guide area. Many additional features and elements of the present application will become apparent to those of ordinary skill in the relevant art as provided for in the following description.

FIGS. 1 through 5 provide an exemplary sand check assembly in accordance with one aspect of the present application. In FIGS. 6 through 19, exemplary sand checks will be described. The sand check assembly and sand check can be combined in numerous configurations known to those skilled in the relevant art. The sand check can be placed within the sand check assembly or be an entirely separate component used for removing solids. Both are designed to allow well fluid that contains high solids to pass through the pump under normal operation, but eliminate the solids from being swept back into the pump barrel on the down stroke of the pump.

Sand Check Assembly

Turning now to FIG. 1, a side view of an exemplary sand check assembly 100 in accordance with one aspect of the present application is provided. The assembly 100 can be made up of a hardened material, such as carbide, an alloy or some other suitable material commonly found within such assemblies 100. The sand check assembly 100 can include a bottom portion 102 and a top portion 106 with a middle portion 104 therebetween. In this embodiment, the assembly 100 can have a substantially longitudinal shape and include a one-piece structure incorporating the bottom portion 102, middle portion 104 and top portion 106.

The bottom portion 102 can have an outer diameter equal to the top portion 106, while the middle portion 104 generally has a diameter that is larger than both. The sand check assembly 100 can be substantially tubular, having a longitudinal channel 202 running therethrough as seen in FIG. 2, which represents a cross-sectional view of the exemplary sand check assembly 100 taken through line 1-1 of FIG. 1. The longitudinal channel 202 can allow the assembly 100 to fit over a valve rod. Typically, each of the components of the assembly 100 are tubular in structure and have an interior hollow portion.

The bottom portion 102 can include male threading 204 such that it can be coupled to a southern end of the middle portion 104. This configuration permits the bottom portion 102 of the assembly 100 to be screwed directly into the middle portion 104, without the need for any connector components. While the bottom portion 102 is shown as a male component in this embodiment of the assembly 100, it should be clearly understood that substantial benefit could be derived from an alternate configuration of the bottom portion 102 in which a female threaded component is employed, without departing from the spirit or scope of the present application.

A sand check filter cap 206 can be placed between the bottom portion 102 and the middle portion 104 as shown in FIG. 2. The cap 206 can be used to hold a screen 208 in position. The screen 208 can allow the assembly 100 from hanging up, sticking to or wedging itself to the valve rod inserted through the longitudinal channel 202. The screen 208 can include one or more radial flutes 210. The radial flutes 210 are located on an interior diameter of the screen 208. When more than one radial flute 210 is used, the flutes 210 can generally be spaced equidistant from each other. In one embodiment, the flutes 210 taper downwardly and have a curvature.

When the assembly 100 rotates, the screen 208 can create a cyclonic action that produces a valve effect atop the screen 208. This can prevent the fluid from passing through the internal diameter of the screen 208 and force the high solid fluid to be redirected to the outer diameter of the assembly 100 allowing the fluid to be filtered before reentering the pump. The flutes 210 cause the cyclone effect on the fluid being pumped. This allows clean fluid or gas to pass through to the valve rod guide.

In one embodiment, the screen 208 can be a cartridge that can be changed out to a different size, allowing the operator to choose the screen mesh. Because each well is unique in the fluid and solids being pumped, matching the screen mesh to the size of the solids allows for better fluid cleaning and fluid passage.

The screen 208 can be held on an upper portion by another sand check filter cap 206. In one embodiment, a sand check 212 can be attached to the sand check filter cap 206 as shown in FIG. 2. The sand check 212 can include a plurality of flutes 214. The sand check 212 and the flutes 214 allow the pumped fluid to be further filtered.

The middle portion 104 can be coupled to the top portion 106. The top portion 106 can include male threading 204, such that it can be coupled to a northern end of the middle portion 104. This configuration permits the top portion 106 of the sand check assembly 100 to be screwed directly into the middle portion 104, without the need for any connector components. While the top portion 106 is shown as a male component in this embodiment of the assembly 100, it should be clearly understood that substantial benefit could be derived from an alternate configuration of the top portion 106 in which a female threaded component is employed, without departing from the spirit or scope of the present application.

FIG. 3 is a top view of the exemplary sand check assembly 100 of FIG. 1. It can be seen that the assembly 100 provides a space for a rod valve to go therethrough. Through the top view, flutes 214 from the sand check 212 can be seen. FIG. 4 is a bottom view of the exemplary sand check assembly 100 of FIG. 1. The bottom view shows the radial flutes 210 in the screen 208 spaced equidistant from each other.

Referring now to FIG. 5, a top perspective view of components within the exemplary sand check assembly 100 of FIG. 1 is provided. The components of the sand check assembly 100 can include, and as shown before, the bottom portion 102, middle portion 104, first sand check filter cap 206, screen 208, second sand check filter cap 206, sand check 212 and top end 106. Each of these components can be fitted together to form the assembly 100. The assembly 100 can be taken apart to replace components that are damaged. Those skilled in the relevant art will appreciate that fewer or more components can be used within the assembly 100 and are not limited to those disclosed herein.

Figure 8:
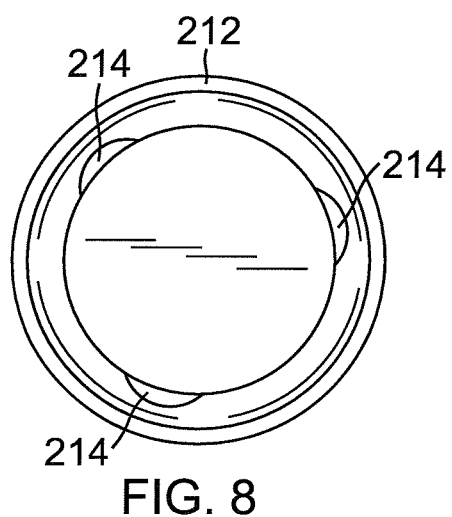
FIG. 8 is a bottom view of the exemplary sand check of FIG. 6.
Figure 9:
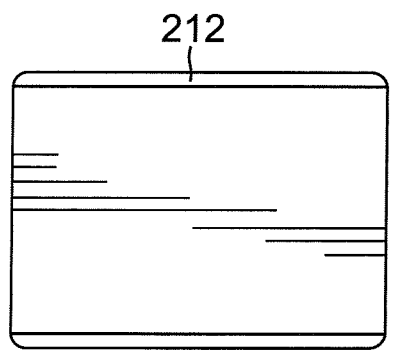
FIG. 9 is a side-perspective view of the exemplary sand check of FIG. 6.

As will become apparent from the discussion below, the sand check 212 can be provided in a number of different forms and can include numerous other features. The sand check 212 along with its flutes 214 described above represent one possible embodiment. FIG. 6 is a top perspective of the sand check 212 of the exemplary sand check assembly 100 of FIG. 1. FIG. 7 is a bottom perspective view of the exemplary sand check 212 of FIG. 2. FIG. 8 is a bottom view of the exemplary sand check of FIG. 2, while FIG. 9 is a side-perspective view of the exemplary sand check of FIG. 2.

Sand Check

Figure 10:
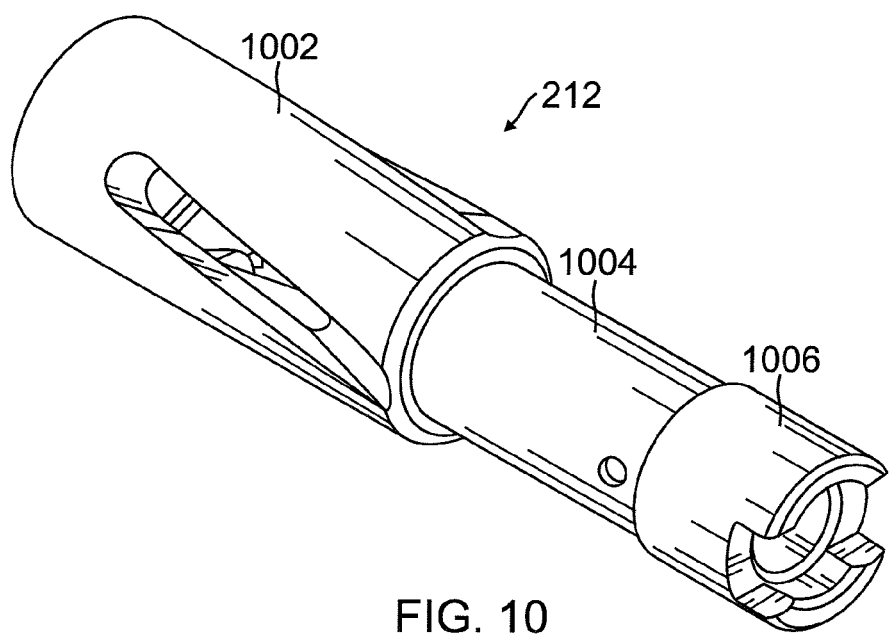
FIG. 10 is a top perspective view of an exemplary sand check in accordance with one aspect of the present application.

Turning now to FIG. 10, and in accordance with another embodiment, a top perspective view of an exemplary sand check 212 is provided. The sand check 212 can be used with the sand check assembly 100 described above or can be an entirely separate component that can be placed around the valve rod. The sand check 212 can be made up of a hardened material, such as carbide, an alloy or some other suitable material commonly found within such assemblies. As shown, the sand check 212 can include a body 1002, neck 1004 and head 1006. Known to those skilled in the relevant art, fewer or more components within the sand check 212 can be used.

Figure 11:
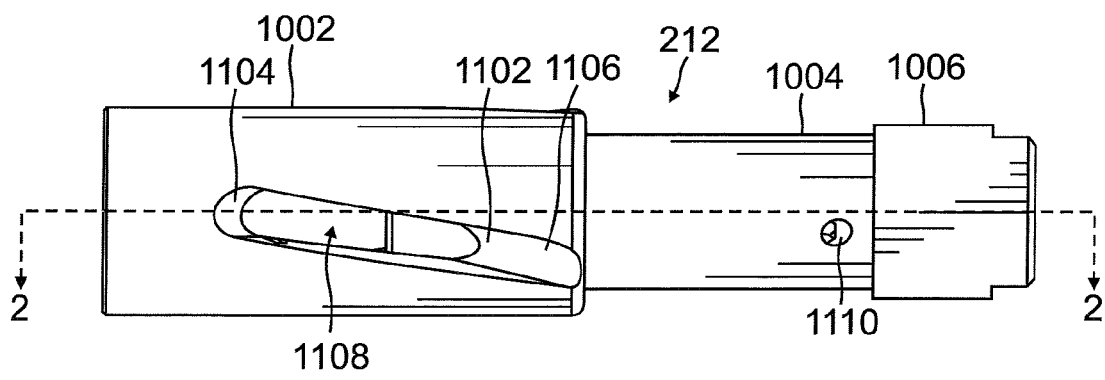
FIG. 11 is a side view of the exemplary sand check of FIG. 10.

FIG. 11 is a side view of the exemplary sand check 212 of FIG. 10. The head 1006 can have an outer diameter greater than the neck 1004 while the neck 1004 can have an outer diameter smaller than the body 1002. The body 1002 of the sand check 212 can include one or more flutes 1102. When more than one flute 1102 is used, the flutes 1102 can be spaced equidistant from each other. The flutes 1102 can extend from a lower portion of the body 1002 to the neck 1004.

In one embodiment, the flutes 1102 can include a first angled slot 1104 directed towards an opening 1108. The flute 1102 can also include a second angled slot 1106 angled away from the opening 1108. The second angled slot 1106 can have a slope that is less than the first angled slot 1104 such that the first angled slot 1104 goes into the opening 1108 quicker than the second angled slot 1106.

Figure 12:
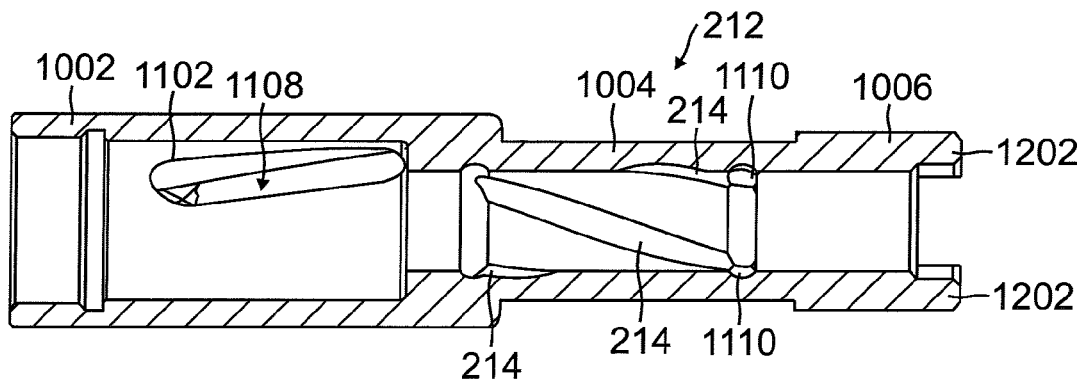
FIG. 12 is a side perspective, cross-sectional view of the exemplary sand check taken through line 2-2 of FIG. 11.

On the neck 1004 of the sand check 212, an aperture 1110 can be provided. FIG. 12 is a side perspective, cross-sectional view of the exemplary sand check 212 taken through line 2-2 of FIG. 11, which illustrates both the flute 1102 and the aperture 1110. The flute 1102 has an opening 1108 leading into the hollow interior of the sand check 212. The flute 1102 along with the opening 1108 allows fluid to enter therethrough. The sand check 212 can include at least one radial groove 214 that can be formed in an interior diameter of the neck 1004. The groove 214 can end through the at least one aperture 1110 defined on an outer diameter of the neck 1004. The diameter of the groove 214 is typically the same as the diameter of the aperture 1110.

The head 1006 of the sand check 212 can include a fastening system 1202. The fastening system 1202 typically incorporates a section whereby the sand check 212 can be rotated. For example, in FIG. 12, two projecting structures are provided for allowing the sand check 212 to rotate. In operation, and when rotated, the grooves 214 can prevent the fluid from passing through the inner diameter of the sand check 212 and force solids within the fluid to be redirected to the outer diameter of the filter. This can allow the fluid to be filtered before reentering the pump. Solids can be forced into the grooves 214 and dispelled out of the apertures 1110 while the flutes 1102 can create a cyclonic motion. The clean fluid can then be dispelled to the tubing.

Figure 13:
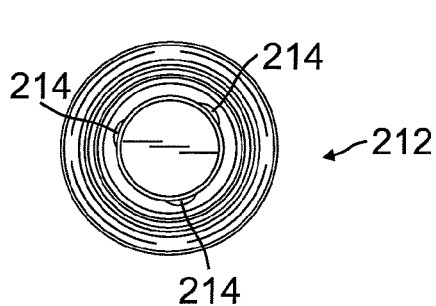
FIG. 13 is a bottom view of the exemplary sand check of FIG. 10.
Figure 14:
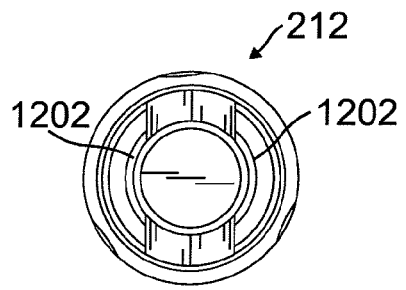
FIG. 14 is a top view of the exemplary sand check of FIG. 10.
Figure 15:
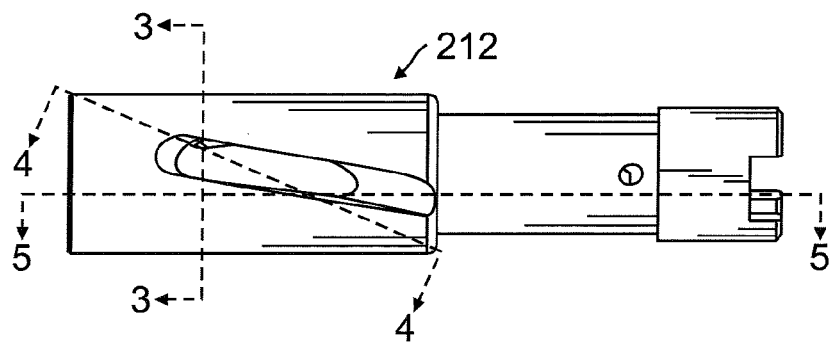
FIG. 15 is a side view of the exemplary sand check of FIG. 10 having multiple cross sections taken therefrom.

FIG. 13 is a bottom view of the exemplary sand check 212 of FIG. 10. In this view, the grooves 214 in the neck 1004 are shown. Referring now to FIG. 14, a top view of the exemplary sand check 212 of FIG. 10 is provided. The head 1006 can be seen along with the fastening system 1202. FIG. 15 is a side view of the exemplary sand check 212 of FIG. 10 having multiple cross sections taken therefrom.

Figure 16:
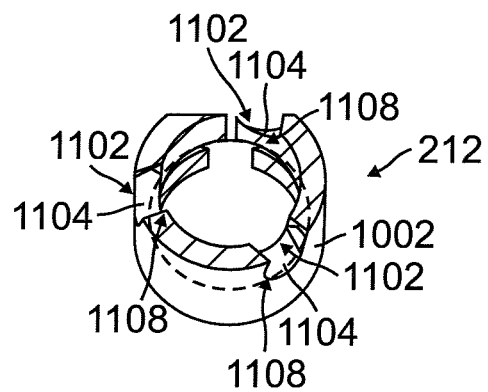
FIG. 16 is a top perspective, cross-sectional view of the exemplary sand check taken through line 3-3 of FIG. 15.

FIG. 16 is a top perspective, cross-sectional view of the exemplary sand check 212 taken through line 3-3 of FIG. 15.

Figure 17:
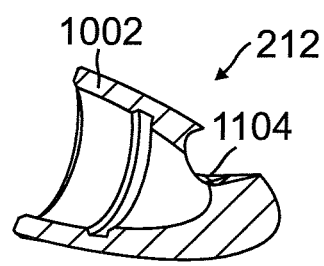
FIG. 17 is a side perspective, cross-sectional view of the exemplary sand check taken through line 4-4 of FIG. 15.
Figure 18:
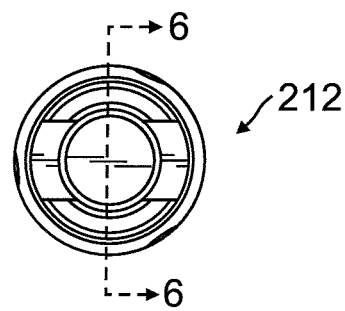
FIG. 18 is a top view of the exemplary sand check of FIG. 15.
Figure 19:
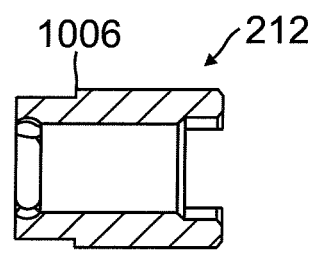
FIG. 19 is a side perspective, cross-sectional view of the exemplary sand check taken through line 6-6 of FIG. 18.

The body 1002 of the sand check 212 shows a first angled slot 1104. The first angled slot 1104 of the flute 1102 can have a steep decline into the opening 1108. Turning now to FIG. 17, a side perspective, cross-sectional view of the exemplary sand check 212 taken through line 4-4 of FIG. 15 is provided. As seen through another view, the first angled slot 1104 can be steep. FIG. 18 is a top view of the exemplary sand check 212 of FIG. 10. FIG. 19 is a side perspective, cross-sectional view of the exemplary sand check taken through line 6-6 of FIG. 18. Known to those skilled in the relevant art, the head 1006 can include a number of different shapes and sizes.

Systems, Apparatus and Methods

In accordance with one aspect of the present application, a sand check is provided. The sand check can include a body portion having a plurality of downwardly tapering flutes, wherein each flute of the plurality of flutes includes an opening. In addition, the sand check can include a neck portion coupled to the body portion having at least one radial groove formed on an interior diameter of the neck portion and ending through at least one aperture defined on an outer diameter of the neck portion. The sand check can also include a head portion coupled to the neck portion. The sand check can include a longitudinal channel defined through the body portion, neck portion and head portion.

In one embodiment, the longitudinal channel can fit a valve rod. In one embodiment, the head portion can have an outer diameter greater than the neck portion and less than the body portion. In one embodiment, the plurality of flutes can extend to the neck portion. In one embodiment, each flute of the plurality of flutes can include a first angled slot directed towards the opening and a second angled slot directed away from the opening. In one embodiment, the first angled slot can have a greater slant than the second angled slot. In one embodiment, the opening can extend to a point below the neck portion. In one embodiment, the first angled slot can begin at an outer diameter of the body portion and the second angled slot can end at the outer diameter of the body portion.

In one embodiment, the plurality of flutes can be spaced equidistant. In one embodiment, the aperture of the neck portion can be angled at thirty degrees from a centerline of the longitudinal channel in an upwards direction. In one embodiment, the neck portion can include two or more radial grooves spaced equidistant and each ending at an aperture defined at the outer diameter of the neck portion. In one embodiment, a diameter of the at least one aperture on the neck portion can be equal to a diameter of the at least one radial groove. In one embodiment, the at least one aperture on the neck portion can be located at a higher position than the at least one radial groove.

In accordance with another aspect of the present application, a method for removing solids from pumped fluid using a sand filter assembly is provided. The method can include forcing the pumped fluid having the solids to an outer diameter of the sand filter assembly. In addition, the method can include filtering the solids from the pumped fluid before the pumped fluid reenters the sand filter assembly.

In one embodiment, forcing the pumped fluid having the solids to an outer diameter of the sand filter assembly can include creating a valve effect atop using a filter screen within the sand filter assembly. In one embodiment, the method can include allowing the filtered pumped fluid to pass through a valve rod guide.

In accordance with yet another aspect of the present application, an apparatus for preventing solids from reentering into a pump is provided. The apparatus can include a plurality of radial ribs that create a cyclone effect on fluid being pumped, the cyclone effect forcing solids within the fluid to an outer edge of the apparatus while allowing the fluid to pass through to a valve rod guide. In addition, the apparatus can include a screen filter removing the solids from the fluid.

In one embodiment, the screen filter can be matched with different solids. In one embodiment, the apparatus can be mounted atop a conventional rod pump. In one embodiment, the apparatus can include a bottom portion, middle portion and top portion, wherein the plurality of radial ribs are positioned within the middle portion.

The foregoing description is provided to enable any person skilled in the relevant art to practice the various embodiments described herein. Various modifications to these embodiments can be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. An assembly for use with a pumping system comprising:
   a top portion;
   a middle portion;
   a bottom portion;
   a screen filter for removing solids from fluid being pumped, wherein the screen filter is positioned within the middle portion, leaving a space between an outer diameter of the screen filter and an interior surface of the middle portion;
   a first filter cap positioned between the bottom portion and the middle portion for holding the screen filter in position;
   a second filter cap positioned above the screen filter for holding the screen filter in position;
   a sleeve positioned between the second filter cap and the top portion; and
   a plurality of radial flutes formed on an interior surface of the screen filter, wherein the radial flutes create a cyclone effect on the fluid being pumped, the cyclone effect allowing the fluid being pumped to pass from an internal diameter of the screen filter to the space between the outer diameter of the screen filter and the interior surface of the middle portion while retaining the solids from the fluid being pumped within the screen filter and forcing the solids upward through the internal diameter of the screen filter.

2. The assembly of claim 1, wherein a size of the screen filter corresponds to a size of solids present within the fluid.

3. The assembly of claim 1, comprising a bottom portion, middle portion and top portion, wherein said plurality of radial flutes are positioned within said middle portion.

4. An assembly for use with a pumping system:
   a bottom portion;
   a middle portion;
   a top portion;

a first filter cap positioned between the bottom portion and the middle portion;
a screen for removing solids from fluid being pumped, wherein the screen is positioned within the middle portion and leaving a space between an outer diameter of the screen and an interior surface of the middle portion, the screen having at least one downwardly tapering radial flute formed on an interior surface of the screen wherein the at least one downwardly tapering radial flute creates a cyclone effect on the fluid being pumped, the cyclone effect allowing the fluid being pumped to pass from an internal diameter of the screen to the space between the outer diameter of the screen filter and the interior surface of the middle portion while retaining the solids from the fluid being pumped within the screen and forcing the solids upward through the internal diameter of the screen;
a second filter cap positioned above the screen; and
a sleeve positioned between the second filter cap and the top portion,
wherein the bottom portion, middle portion, top portion, first filter cap, screen, second filter cap, and sleeve each defines a longitudinal channel therethrough.

5. The assembly of claim 4 wherein the sleeve comprises:
a body portion having a plurality of downwardly tapering flutes, wherein each flute of the plurality of flutes includes an opening;
a neck portion coupled to the body portion and having at least one radial groove formed on an interior diameter of the neck portion and ending through at least one aperture defined on an outer diameter of the neck portion;
a head portion coupled to the neck portion; and
a longitudinal channel defined through the body portion, neck portion, and head portion.

6. The assembly of claim 5, wherein said head portion has an outer diameter greater than said neck portion and less than said body portion.

7. The assembly of claim 5, wherein said plurality of flutes on the body portion of the sleeve extend to said neck portion.

8. The assembly of claim 5, wherein each flute of said plurality of flutes on the body portion of the sleeve comprises a first angled slot directed towards said opening and a second angled slot directed away from said opening.

9. The assembly of claim 8, wherein said first angled slot has a greater slant than said second angled slot.

10. The assembly of claim 8, wherein said opening extends to a point below said neck portion.

11. The assembly of claim 8, wherein said first angled slot begins at an outer diameter of said body portion and said second angled slot ends at said outer diameter of said body portion.

12. The assembly of claim 5, wherein said aperture of said neck portion is angled at thirty degrees from a centerline of said longitudinal channel in an upwards direction.

13. The assembly of claim 5, wherein said neck portion comprises two or more radial grooves spaced equidistant and each ending at an aperture defined at said outer diameter of said neck portion.

14. The assembly of claim 5, wherein a diameter of said at least one aperture on said neck portion is equal to a diameter of said at least one radial groove.

15. The assembly of claim 5, wherein said at least one aperture on said neck portion is located at a higher position than said at least one radial groove.

16. The assembly of claim 4 wherein said at least one downwardly tapering radial flute on the interior surface of the screen creates a cyclonic action when said assembly rotates and produces a valve effect atop the screen.

17. An assembly for use with a pumping system:
a bottom portion;
a middle portion;
a top portion;
a first filter cap positioned between the bottom portion and the middle portion;
a screen for removing solids from fluid being pumped, wherein the screen is positioned within the middle portion and leaving a space between an outer diameter of the screen and an interior surface of the middle portion, said screen comprising a plurality of downwardly tapering curved radial flutes formed on an interior surface of the screen wherein the downwardly tapering curved radial flutes create a cyclone effect on the fluid being pumped, the cyclone effect allowing the fluid being pumped to pass from an internal diameter of the screen to the space between the outer diameter of the screen and the interior surface of the middle portion while retaining the solids from the fluid being pumped within the screen and forcing the solids upward through the internal diameter of the screen;
a second filter cap positioned above the screen; and
a sleeve positioned between the second filter cap and the top portion, said sleeve comprising:
a body portion having a plurality of downwardly tapering flutes, wherein each flute of the plurality of flutes on the body of the sleeve includes an opening;
a neck portion coupled to the body portion and having at least one radial groove formed on an interior diameter of the neck portion and ending through at least one aperture defined on an outer diameter of the neck portion; and
a head portion coupled to the neck portion;
wherein each component of the assembly defines a longitudinal channel therethrough.

* * * * *